United States Patent [19]
Yotsuyanagi et al.

[11] Patent Number: 5,972,054
[45] Date of Patent: Oct. 26, 1999

[54] METHOD FOR LAMINATING SOLID POLYMER ELECTROLYTE FILM

[75] Inventors: Junji Yotsuyanagi; Motoyuki Hirata, both of Kawasaki, Japan

[73] Assignee: Showa Denko K.K., Tokyo, Japan

[21] Appl. No.: 08/946,882

[22] Filed: Oct. 8, 1997

Related U.S. Application Data

[63] Continuation-in-part of application No. 08/822,977, Mar. 21, 1997, abandoned, and application No. PCT/JP97/00945, Mar. 21, 1997.
[60] Provisional application No. 60/014,479, Apr. 1, 1996.

[30] Foreign Application Priority Data

Mar. 21, 1996 [JP] Japan .................................. 8-093681

[51] Int. Cl.⁶ ..................................................... H01M 6/00
[52] U.S. Cl. ....................... 29/623.1; 29/623.2; 29/623.3; 29/623.4; 29/623.5; 429/152; 429/189; 429/190; 429/192; 429/212; 429/213; 429/217
[58] Field of Search ................................ 29/623.1, 623.2, 29/623.3, 623.4, 623.5; 429/152, 189, 190, 192, 213, 212, 217

[56] References Cited

U.S. PATENT DOCUMENTS

| | | | |
|---|---|---|---|
| 4,830,939 | 5/1989 | Lee et al. | 429/192 |
| 4,935,317 | 6/1990 | Fauteux et al. | 429/192 |
| 4,968,319 | 11/1990 | Muller et al. | 29/623.5 |
| 5,100,746 | 3/1992 | Muller et al. | 429/94 |
| 5,217,827 | 6/1993 | Fauteux et al. | 429/192 |
| 5,376,210 | 12/1994 | Brochu et al. | 156/344 |
| 5,470,357 | 11/1995 | Schmutz et al. | 29/623.5 |
| 5,498,489 | 3/1996 | Dasgupta et al. | 424/152 |
| 5,536,278 | 7/1996 | St-Amant et al. | 29/623.3 |
| 5,597,661 | 1/1997 | Takeuchi et al. | 429/42 |
| 5,665,490 | 9/1997 | Takeuchi et al. | 429/192 |

FOREIGN PATENT DOCUMENTS 3-89457  4/1991  Japan .............................. H01M 2/16

*Primary Examiner*—Frederick Krass
*Attorney, Agent, or Firm*—Sughrue, Mion, Zinn, Macpeak & Seas, PLLC

[57] ABSTRACT

A method for laminating a solid polymer electrolyte film. In one of a number of embodiments the method disclosed comprises laminating a layer of a fluid solid polymer electrolyte on a base film or on a thin layer comprising a metal or a metal oxide which is laminated on a base film.

11 Claims, No Drawings

METHOD FOR LAMINATING SOLID POLYMER ELECTROLYTE FILM

CROSS REFERENCE TO RELATED APPLICATIONS

This is a continuation-in-part of (1) U.S. application Ser. No. 08/822,977, filed Mar. 21, 1997, now abandoned, which in turn claims benefit of U.S. Provisional Application 60/014,479, filed Apr. 1, 1996 and of Japanese Patent Application 8/93681, filed Mar. 21, 1996; and (2) International Application PCT/JP97/00945, filed Mar. 21, 1997, which claims benefit from Japanese Patent Application 8/93681, filed Mar. 21, 1996.

FIELD OF THE INVENTION

The present invention relates to a method for laminating a solid polymer electrolyte film and a method for laminating the film on an electrode.

BACKGROUND OF THE INVENTION

A solid polymer electrolyte (hereinafter referred to as a "SPE") is a polymer substance which exhibits a high ion conductivity in the solid state, and the application thereof to various sensors and fuel cells is anticipated.

Furthermore, the SPE can be applied to a next generation battery, a photoelectric cell or an electrochromic element.

In order to impart high ion conductivity to a SPE, the SPE must have a low glass transition temperature. However, when the glass transition temperature is low, the film strength is lowered which makes the SPE difficult to handle in an industrial environment.

Furthermore, in order to improve the ion conductivity, a method of adding an organic solvent is often used. However, this causes a reduction in strength which makes the SPE even more difficult to handle.

Accordingly, at present, a method of coating a SPE prepolymer directly on an electrode, followed by cross-linking and solidification, is commonly used.

However, the above-described method encounters difficulty in controlling the polymerization degree of the SPE or the thickness of the SPE film, and a homogenous and uniform SPE film can hardly be obtained.

For these reasons, it has been difficult to obtain a SPE film comprising a SPE material having a low glass transition temperature, a high ion conductivity, a homogeneous ion conductivity and a uniform thickness. It has also been difficult to composite a SPE layer by laminating the SPE layer on an electrode such that the layer homogeneously adheres to the electrode to provide good electrical contact between the SPE layer and the electrode.

Since a SPE may have a water-absorbing property depending on the kind of SPE, the atmosphere should be controlled in order to control the water content during the step of compositing the SPE and an electrode.

SUMMARY OF THE INVENTION

The present invention has been accomplished under the above-mentioned circumstances, and an object of the present invention is to provide a homogeneous SPE composite film and a method for producing the composite film. Another object of the present invention is to provide a method for laminating a SPE film on an electrode in a simple and easy manner. Yet another object of the present invention is to provide a method for producing a SPE composite electrode.

As a result of extensive investigations, the present inventors have succeeded in achieving an SPE composite film by a simple and easy method and a lamination of the film on an electrode. Based on this finding, the present invention has been accomplished.

Namely, the present inventors have developed a method for producing a SPE composite film of homogeneous ion conductivity and uniform thickness by compositing a SPE layer comprising a SPE material having a low glass transition temperature and a high ion conductivity with a base film, and a method for producing a SPE laminate film of good shelf-life which comprises a SPE film derived from the SPE composite film as a constituent structural member. The present inventors have also developed a method for laminating a SPE film on an electrode by using the SPE laminate film and a method for producing a SPE composite electrode.

Specifically, the present invention provides a convenient method for producing a SPE laminate film comprising a base film such as those made of plastic and a SPE layer ("SPE laminate film" is hereinafter referred to as a "composite film"), for producing a composite film comprising a base film, a SPE layer and a cover film. The present invention also provides a method for producing a SPE composite electrode using a composite film of the present invention, more specifically, a method for producing a SPE composite electrode in which a SPE film having a base film thereon is laminated on an electrode. The method comprises laminating the SPE surface opposite the base film of the composite film, or laminating the SPE surface from which a cover film is removed when the composite film has a cover film, on an electrode previously coated with a curable adhesive such that the SPE surface contacts the electrode, and then curing the adhesive. The present invention also provides a method for producing a SPE composite electrode which comprises providing a SPE composite electrode in which a SPE film having a base film thereon is laminated on an electrode as described above, removing the base film, and laminating a second constituent structural member such as another electrode on the exposed SPE surface.

More specifically, the present invention provides the following methods for laminating a SPE film (methods for producing a composite film) and methods for producing a SPE composite electrode:

(1) a method for laminating a SPE film which comprises laminating a layer of a fluid SPE on a base film or on a thin layer comprising a metal or a metal oxide which is laminated on a base film, and applying pressure to the resulting laminate with a force applied on the upper surface of the laminate and a force in opposition thereto applied on the lower surface of the laminate;

(2) a method for laminating a SPE film which comprises laminating a layer of a fluid SPE on a base film or on a thin layer comprising a metal or a metal oxide which is laminated on a base film, followed by laminating a cover film on a surface of said fluid SPE layer, and applying pressure to the resulting laminate with a force applied on the upper surface of the laminate and a force in opposition thereto applied on the lower surface of the laminate;

(3) a method for laminating a SPE film which comprises laminating a layer of a fluid SPE containing a polymerizable compound on a base film or on a thin layer comprising a metal or a metal oxide which is laminated on a base film, polymerizing said polymerizable compound, thereby making said SPE layer substantially non-flowable, and applying pressure to the resulting laminate with a force applied on the upper surface of the laminate and a force in opposition thereto applied on the lower surface of the laminate;

(4) a method for laminating a SPE film which comprises laminating a layer of a fluid SPE containing a polymerizable compound on a base film or on a thin layer comprising a metal or a metal oxide which is laminated on a base film, followed by laminating a cover film on a surface of said fluid SPE layer, polymerizing said polymerizable compound, thereby making the SPE layer substantially non-flowable, and applying pressure to the resulting laminate with a force applied on the upper surface of the laminate and a force in opposition thereto applied on the lower surface of the laminate;

(5) a method for laminating a SPE film according to any one of items (1) to (4) above, wherein the ion conductivity of the SPE film is $10^{-4}$ $\Omega^{-1}$ $cm^{-1}$ or greater;

(6) a method for producing a SPE composite electrode which comprises providing a SPE film in the form of a laminate consisting of a SPE layer and a base film or consisting of a SPE layer and a base film having said thin layer thereon according to the method described in items (1) or (3) above, followed by laminating the SPE surface of said laminate on an electrode previously coated with a curable adhesive such that the SPE surface contacts the electrode, and then curing the adhesive;

(7) a method for producing a SPE composite electrode which comprises providing a SPE film in the form of a laminate consisting of a SPE layer, a base film and a cover film or consisting of a SPE layer, a base film having said thin layer thereon and a cover film as described in items (2) or (4) above, removing the cover film from the SPE layer of said laminate, laminating the SPE surface of said laminate on an electrode previously coated with a curable adhesive such that the SPE surface contacts the electrode, and then curing the adhesive;

(8) a method for producing a SPE composite electrode which comprises providing a SPE film in the form of a laminate consisting of a SPE layer and a base film or consisting of a SPE layer and a base film having said thin layer thereon according to the method described in items (1) or (3) above, followed by laminating the SPE surface of said laminate on an electrode previously coated with a curable adhesive such that the SPE surface contacts the electrode, curing the adhesive, then removing the base film or the base film having said thin layer thereon to expose a surface of said SPE layer, and laminating another constituent structural member on the exposed surface of said SPE;

(9) a method for producing a SPE composite electrode which comprises providing a SPE film in the form of a laminate consisting of a SPE layer, a base film and a cover film or consisting of a SPE layer, a base film having said thin layer thereon and a cover film according to the method described in items (2) or (4) above, followed by removing the cover film from the SPE layer of said laminate, laminating the SPE surface of said laminate on an electrode previously coated with a curable adhesive such that the SPE surface contacts the electrode, then curing the adhesive, then removing the base film or the base film having said thin layer thereon to expose a surface of said SPE layer, and laminating another constituent structural member on the exposed surface of said SPE;

(10) a method for producing a SPE composite electrode which comprises providing a SPE film in the form of a laminate consisting of a SPE layer and a base film or consisting of a SPE layer and a base film having said thin layer thereon according to the method described in items (1) or (3) above, laminating the SPE surface of said laminate on an electrode previously coated with a curable adhesive such that the SPE surface contacts the electrode, curing the adhesive, then removing the base film or the base film having said thin layer thereon to expose a surface of said SPE layer, and laminating a second electrode on the exposed SPE surface; and

(11) a method for producing a SPE composite electrode which comprises providing a SPE film in the form of a laminate consisting of a SPE layer, a base film and a cover film or consisting of a SPE layer, a base film having said thin layer thereon and a cover film according to the method described in items (2) or (4) above, followed by removing the cover film from the SPE layer of said laminate, laminating the SPE surface of said laminate on an electrode previously coated with a curable adhesive such that the SPE surface contacts the electrode, then curing the adhesive, then removing the base film or the base film having said thin layer thereon to expose a surface of said SPE layer, and laminating a second electrode on the exposed SPE surface.

DETAILED DESCRIPTION OF THE INVENTION

The base film for use in the present invention preferably includes various water-proof plastic films. Examples thereof include general thermoplastic resins such as polyolefins including polyethylene and polypropylene, polyvinyl chloride, polyesters such as polyethylene terephthalate (PET) and polyamides such as nylon-6 and nylon-6,6. The film may either be an unstretched film or a stretched film. The thickness of the base film is suitably from 1 to 5,000 $\mu$m, preferably from 1 to 1,000 $\mu$m, and more preferably from 5 to 100 $\mu$m.

The base film for use in the present invention preferably also includes a laminate film comprising the above-mentioned base film having laminated thereon a metal or metal oxide such as aluminum, alumina and silica by a known method such as vapor deposition.

In addition to plastic films, other films can be used as long as they can be readily removed from a SPE. Examples thereof include a metal foil such as aluminum foil, stainless steel foil and copper foil.

The SPE for use in the present invention comprises a polymer substance obtained by polymerizing a polymerizable compound in the presence or absence of an electrolyte salt. The mobility of an electrolyte ion in the SPE is high in the presence of at least one electrolyte salt, thereby providing an ion conductivity of $10^{-6}$ $\Omega^{-1}$ $cm^{-1}$ or greater, preferably $10^{-5}$ $\Omega^{-1}$ $cm^{-1}$ or greater, and more preferably $10^{-4}$ $\Omega^{-1}$ $cm^{-1}$ or greater. The expression "wherein the mobility of an electrolyte ion . . . $10^{-4}$ $\Omega^{-1}$ $cm^{-1}$ or greater" means that the SPE material for use in the present invention includes not only an SPE containing an electrolyte salt and having an ion conductivity within the above-mentioned range, but also a SPE which provides an ion conductivity within the above-mentioned range when an electrolyte salt and/or solvent that is later added to the SPE contained in a SPE composite electrode that is produced using the composite film of the present invention, or in an electrochemical apparatus such as a battery or capacitor that is produced using the SPE composite electrode of the present invention.

Polymerization may be performed by thermal polymerization or a known method by exposing with active light such as visible light, ultraviolet light, electron beams, γ rays or X rays.

Examples of the polymerizable compound include functional monomers and oligomers having at least one hetero atom.

Specific examples thereof include (meth)acrylic ester and di(meth)acrylic ester each having an oxyalkylene chain such as methacrylic acid ω-methyl oligooxyethyl ester; alkyl methacrylates such as methyl methacrylate and n-butyl acrylate; (meth)acrylamide-base compounds such as acrylamide, methacrylamide, N,N-dimethylacrylamide, N,N-dimethylmethacrylamide, acryloylmorpholine, methacryloylmorpholine and N,N-dimethylaminopropyl(meth) acrylamide; N-vinylamide-base compounds such as N-vinylacetamide and N-vinylformamide; alkyl vinyl ethers such as ethyl vinyl ether; polyfunctional (meth)acrylates such as trimethylolpropane tri(meth)acrylate, pentaerythritol penta(meth)acrylate and dipentaerythritol hexa(meth) acrylate; and various urethane acrylate prepolymers such as phenylglycidyl ether acrylate hexamethylene diisocyanate urethane prepolymer and phenylglycidyl ether acrylate isophorone diisocyanate urethane prepolymer.

Additional examples thereof include urethane (meth) acrylates containing an oxyalkylene chain having at least one unit represented by the following formula in one molecule:

wherein $R^1$ represents hydrogen or a methyl group; $R^2$ represents a divalent organic group containing an oxyalkylene group, the organic group may have any of linear, branched and cyclic structures or may contain an element other than carbon, hydrogen and oxygen; x and y each independently represents 0 or an integer of from 1 to 5; z represents 0 or an integer of from 1 to 10, provided that when both of x and y are zero, z is zero; the moiety ($CH_2$) and the moiety ($CH(CH_3)$) may be randomly configured; and $R^1$, $R^2$ and values of x, y and z in a plurality of units represented by the above formula within the same molecule are independent of the respective units and may be the same or different.

Specific examples of the compound represented by the above-described formula include N-methacryloylcarbamic acid ω-methyl oligooxyethyl ester and methacryloyloxyethylcarbamic acid ω-methyl oligooxyethyl ester. These polymerizable compounds may be used individually or in a combination of two or more thereof.

Among the above-described polymerizable compounds, oxyalkylene chain-containing urethane (meth)acrylate, urethane acrylate, oxyalkylene chain-containing (meth)acrylic ester and (meth)acrylamide-base compounds are preferred. oxyalkylene chain-containing urethane (meth)acrylate is more preferred.

Furthermore, in order to obtain a polymer in a crosslinked form, at least one polyfunctional polymerizable compound is preferably used in combination with another polymerizable compound. In the specification of the present invention, the term ". . . (meth)acryl . . . " is a generic term including ". . . methacryl . . . " and ". . . acryl . . . ", and the term "alkyleneoxy" and "oxyalkylene" have the same meaning.

In the SPE film comprising a SPE material having a low glass transition temperature and a high ion conductivity according to the present invention, the glass transition temperature of the SPE material is not the glass transition temperature of the polymeric substance constituting the SPE material. Rather, it is the glass transition temperature of a composite material which comprises, in addition to the polymer substance, at least one member selected from the group consisting of a plasticizer, a solvent, a polymerizable compound or an oligomer thereof and an electrolyte salt. Therefore, the SPE material of the present invention includes, in addition to the polymer that is obtained from the above-mentioned polymerizable compound, those having a glass transition temperature of room temperature or lower by adding a plasticizer, solvent, etc., even if the substance itself has a glass transition temperature that is higher than room temperature, such as polyacrylonitrile.

The term "having a high ion conductivity" as used herein means that the ion conductivity is $10^{-6}$ $\Omega^{-1}$ $cm^{-1}$ or greater, preferably $10^{-5}$ $\Omega^{-1}$ $cm^{-1}$ or greater, and more preferably $10^{-4}$ $\Omega^{-1}$ $cm^{-1}$ or greater.

Examples of the electrolyte salt include $LiClO_4$, $LiBF_4$, $LiAsF_6$, $LiCF_3SO_3$, $LiPF_6$, LiI, LiBr, LiSCN, $LiN(CF_3SO_2)_2$, NaI, $Li_2B_{10}Cl_{10}$, $LiCF_3CO_2$, NaBr, NaSCN, KSCN, $MgCl_2$, $Mg(ClO_4)_2$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$ and $(n-C_5H_{11})_4NI$. Among these, Li salts such as $LiClO_4$ and $LiPF_6$ and quaternary ammonium salts such as $(C_2H_5)_4NClO_4$ are preferred.

The blending ratio of the electrolyte salt is generally from 0.1 to 70 parts by weight, preferably from 1 to 50 parts by weight, more preferably from 1 to 30 parts by weight, per 100 parts by weight of the polymerizable compound.

A plasticizer, a solvent, a polymerization initiator or the like may be blended into the SPE of the present invention, if desired. Examples of the plasticizer or solvent include tetrahydrofuran, 2-methyltetrahydrofuran, 1,3-dioxolane, 4,4-dimethyl-1,3-dioxane, γ-butyrolactone, ethylene carbonate, propylene carbonate, butylene carbonate, sulfolane, 3-methylsulfolane, t-butyl ether, i-butyl ether, 1,2-dimethoxyethane, 1,2-diethoxymethoxyethane, methyldiglyme, methyltriglyme, methyltetraglyme, ethylglyme and ethyldiglyme. These compounds may be used individually or in combination of two or more thereof.

Examples of the polymerization initiator include a radical thermal polymerization initiator such as azobisisobutyronitrile and benzoyl peroxide, a radial photopolymerization initiator such as benzyl methyl ketal and benzophenone, a cationic polymerization catalyst such as a protonic acid (e.g., $CF_3COOH$) and a Lewis acid (e.g., $BF_3$, $AlCl_3$), and an anionic polymerization catalyst such as butyl lithium, sodium naphthalene and lithium alkoxide.

The thickness of the SPE film (layer) of the present invention is generally from 0.1 to 1,000 μm, preferably from 0.1 to 300 μm, more preferably from 0.1 to 50 μm.

The base film for use in a composite film of the present invention should have good wettability to the SPE or fluid SPE at the time of forming the composite film. When the SPE composite electrode has a base film thereon and is used for laminating another constituent structural member such as a second electrode on the exposed SPE surface by removing the base film, the base film should have good removability from the SPE film layer. Namely, the base film should be removable without deforming the shape of the SPE film. Accordingly, it is preferable to form (laminate) a thin layer comprising a metal or a metal oxide on the base film surface, on which the SPE is laminated.

The metal or metal oxide thin film may be a thin film generally used for improving the gas barrier property of a plastic film. Specific examples thereof include a foil of or a film evaporated with a metal such as aluminum, stainless steel or copper, and a film evaporated with a metal oxide such as silica or alumina. Among these, an aluminum foil, an aluminum-evaporated film, a silica-evaporated film and an alumina-evaporated film are preferred.

The thickness of the thin film is not particularly limited, however, in the case of a foil, it is preferably from 5 to 100 μm and in the case of an evaporated film, from 50 to 2,000 Å.

Preferred examples of the composite film in the present invention include (a) a structure in which the SPE layer is laminated on the surface of a base film, (b) a structure in which the SPE film is laminated on a thin layer comprising a metal or a metal oxide laminated on a base film, and (c) a structure in which a cover film is laminated on the side of the SPE film layer opposite the base film of either of the above composite film (a) and (b), and any of these is optionally selected depending on the use.

The composite film is preferably used in a method for producing a SPE composite electrode which comprises laminating a fluid SPE (or a fluid SPE precursor material) on a base film or a thin layer comprising a metal or metal oxide which is laminated on a base film by an optionally selected method such as coating, spraying, and dipping, and if necessary, causing a polymerization reaction, thereby making the SPE substantially non-flowable.

When the composite film has a structure which comprises a cover film, it can be produced by (i) a method comprising laminating a cover film after laminating a SPE film layer on a base film or a base film having a thin layer comprising a metal or a metal oxide laminated thereon as described above, (ii) a method comprising laminating the SPE on a cover film substantially in a non-flowable state, in a similar manner as described above, and then laminating thereon a base film or a base film having a thin layer comprising a metal or a metal oxide laminated thereon, or (iii) a method comprising laminating a fluid SPE (or a fluid SPE precursor material) between a base film or a base film having a thin layer comprising a metal or a metal oxide laminated thereon and a cover film, and then if necessary, causing a polymerization reaction, thereby making the SPE a substantially non-flowable film.

The term "fluid SPE" and "fluid SPE precursor material" each includes not only a flowable state SPE and a SPE precursor material, respectively, at room temperature (20° C.) under atmospheric pressure, but also those which are flowable at room temperature under a pressure of 50 kgf/cm$^2$ or lower. However, the fluid SPE as used in the method described in items (1) or (2) above preferably does not flow when laminated on a base film or a thin layer comprising a metal or a metal oxide laminated on a base film at room temperature and under atmospheric pressure during a period of one hour, but is flowable over a period that is longer than one hour at room temperature and under atmospheric pressure or is flowable under a pressure that is higher than atmospheric pressure and 50 kgf/cm$^2$ or lower.

When a SPE has a moisture-absorbing property, a cover film is preferably laminated thereon by means of, for example, nip rolls. The cover film is not particularly limited, and the above-described plastic film which can be used as a base film may be appropriately used, and a film which is easily removed from the SPE film is preferably used.

When the composite film according to the present invention comprises a cover film, pressure is preferably applied to the SPE laminate film with a force applied on the upper surface of the laminate and a force in opposition thereto applied on the lower surface of the laminate in the method described in (i), (ii) or (iii) above so that the thickness of the SPE film in the composite film can be controlled. Any conventional press methods can be used as a pressurization method. When a composite film is continuously produced, a general pressure molding method such as a method using nip rolls is preferably used, and a method for continuously producing the composite film is a particularly preferred embodiment of the present invention.

The pressurization pressure can be a pressure used in a conventional laminate molding, and therefore is not particularly limited. Generally, pressurization is effected under a pressure of 50 kgf/cm$^2$ or lower as generally used in low pressure molding, as long as the thickness of the SPE film can be controlled to a desired thickness. For example, when nip rolls are used, the pressure is not specifically limited so long as the pressing provides the desired thickness and does not adversely affect the performance of the composite film. For instance, a roll pressure between 1 to 30 kgf/cm$^2$ is preferred, and 5 to 10 kgf/cm$^2$ is more preferred.

With respect to the electrode for use in the present invention, examples of the negative electrode include lithium metals, lithium alloys such as lithium/aluminum alloy, lithium/lead alloy and lithium/antimony alloy, and when Li ion is used as a carrier, the electrode may comprise a carbon material.

Examples of the positive electrode include metal oxides such as cobalt oxide, manganese oxide, vanadium oxide, nickel oxide and molybdenum oxide, metal sulfides such as molybdenum sulfide, titanium sulfide and vanadium sulfide, electroconductive polymers such as polyacetylene and derivatives thereof, polyparaphenylene and derivatives thereof, polypyrrole and derivatives thereof, and polythienylene and derivatives thereof, natural graphite, artificial graphite, vapor phase process graphite, petroleum coke, coal coke, fluorinated graphite, pitch-base carbon, polyacene and carbon materials.

Examples of the curable adhesive for use in the present invention include the above-described polymerizable compounds and fluid mixtures containing the polymerizable compound. As the curable adhesive, a fluid mixture having the same composition as the SPE film, to the extent possible, is particularly preferred, from the view point of the homogeneousness of the SPE film on the electrode. However, the curable adhesive is not limited to such compositions.

The adhesive can be coated onto the electrode by a known method such as coating, spraying, and dipping the adhesive on the electrode. The term "electrode previously coated with a curable adhesive" as used herein means that one of the surfaces of the electrode is previously covered by a curable adhesive, and the electrode may or may not be impregnated with the curable adhesive.

In a method for laminating a SPE film on an electrode using a composite film of the present invention, and in a method for producing a SPE composite electrode using a composite film of the present invention, a SPE composite electrode is prepared by providing a SPE film having a base film laminated thereon (composite film), laminating the SPE surface opposite the base film (or a SPE surface which is exposed while removing a cover film therefrom when the composite film comprises a cover film) on an electrode previously coated with a curable adhesive such that the exposed SPE surface contacts the electrode, and then curing the adhesive. A SPE composite electrode having a SPE film of a uniform thickness laminated on the electrode can be obtained by applying pressure to the laminated SPE composite electrode with a force applied on the upper surface of the laminate and a force in opposition thereto applied on the lower surface of the laminate during the step of curing the adhesive, during the steps before the start of curing to the end of the curing, or after curing. This method is particularly preferred as a method for laminating a SPE film and a method for producing a SPE composite electrode.

Furthermore, after one SPE composite electrode such as a single electrode-SPE composite is prepared using the composite film of the present invention as described above, another SPE composite electrode such as a two member-SPE composite can be produced by a succeeding method which comprises removing the base film from the SPE composite electrode, and then (or while removing the base film), laminating another constituent structural member such as a second electrode on the exposed SPE surface. Again, a SPE composite electrode in which a SPE film of uniform thickness is laminated on the electrode can be obtained by applying pressure to the laminate with a force applied on the upper surface of the laminate and a force in opposition thereto applied on the lower surface of the laminate by means of a press or roll method in the step of laminating another constituent structural member on the SPE surface. This method is particularly preferred as a method for laminating a SPE film and a method for producing a SPE composite electrode. In the above method for producing a SPE composite electrode and in case of applying pressure, the pressurization conditions can be determined in a similar way as described in the preparation of a composite film as described above.

In the method for laminating a SPE film (method for producing a composite film) and in the method for producing a SPE composite electrode, the atmosphere under which each step is conducted is preferably a moisture controlled atmosphere. Thus, a dry atmosphere such as dry air, dry nitrogen and dry argon, if necessary, is preferably used because SPE's, in general, often have a moisture-absorbing property, and is particularly preferably used when the surface of the fluid SPE or fluid SPE material layer is exposed to the atmosphere. Similarly, it is preferable to work in an inert atmosphere when the surface of the fluid SPE containing a polymerizable compound is exposed to the atmosphere.

The temperature at which each step is conducted is not particularly limited, as long as the temperature does not adversely affect the properties of the SPE film, and normally room temperature is appropriate. However, in the step of polymerizing a polymerizable compound by heat polymerization, heating is provided to the extent necessary to cause the polymerization reaction.

EXAMPLES

The present invention is described in greater detail below.

In the Examples below, the water content was measured according to Karl Fischer's method. The film thickness was measured using a dial thickness meter manufactured by Peacock.

The ion conductivity was measured by an AC impedance method.

The fluid SPE used herein was prepared by adding 1.5 parts by weight of Irgacure 500 (produced by Ciba Geigy AG, a polymerization initiator) to 100 parts by weight of a mixture consisting of 30 wt % of the following polyfunctional compound:

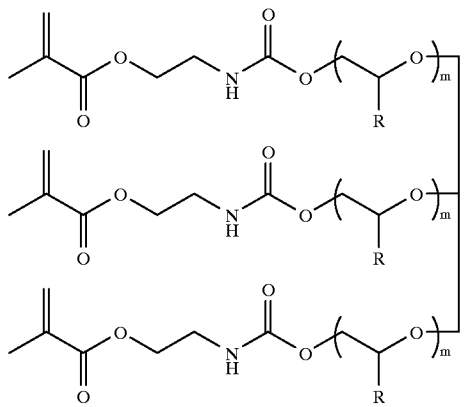

(wherein m=25 and R is a methyl group), 10 wt % of $LiBF_4$ (electrolyte salt), 30 wt % of ethylene carbonate (plasticizer) and 30 wt % of propylene carbonate (plasticizer).

The resulting solution had a viscosity of 200 cp.

The following films were used as base materials:
PET-1: polyester film (PET) (thickness: 12 $\mu$m)
ONy: biaxially stretched nylon (–6,6) film (thickness: 15 $\mu$m)
PET-2: PET-1 evaporated with alumina (thickness: 1,000 Å)
PET-3: PET-1 evaporated with silica (thickness: 1,000 Å)
PET-4: PET-1 evaporated with aluminum (thickness: 2,000 Å)

The cover film used herein was a 50 $\mu$m-thick biaxially stretched polypropylene film (hereinafter referred to as "OPP") or high density polyethylene film (hereinafter referred to as "PE").

The electrode used herein was obtained by coating lithium cobaltate to a thickness of 70 $\mu$m on a 50 $\mu$m-thick aluminum foil.

Example 1

The fluid SPE was coated on PET-1 by means of a coater using a doctor knife method under an atmosphere having a dew point of –50° C. to a small thickness. Then, after irradiating with ultraviolet rays under a nitrogen atmosphere to polymerize and cross-link the polymerizable compound (the above polyfunctional compound), OPP was laminated on the cured surface by means of nip rolls. The laminate (composite film) comprising a SPE film layer (45 $\mu$m-thick) was then roll-winded at a temperature of 20° C. and humidity of 5 RH %.

The ion conductivity of the SPE film of the composite film was $2\times10^{-3}$ S/cm when measured at 25° C. by a known AC impedance method.

Then, under an atmosphere having a dew point of –50° C., a coated surface of an electrode on which the above fluid SPE was coated was laminated on the SPE surface of the laminate (composite film) obtained above by means of nip rolls while peeling off the cover film from the composite film. Ultraviolet rays were irradiated through the PET film to polymerize (cross-link) the electrode coating and bond the electrode to the SPE to obtain a laminate (SPE composite electrode) by winding at a temperature of 20° C. and a humidity of 5 RH %.

The laminate (SPE composite electrode) thus obtained had a thin and uniform SPE film having a thickness of 50

μm±20%. The releasability of the PET film was good and the film could be peeled off without deforming the SPE film surface. The water content of the SPE film was 200 ppm or less.

Example 2

A SPE film (composite film) and SPE composite electrode were obtained in the same manner as in Example 1, except for changing the base film to ONy. The SPE film of the SPE composite electrode thus obtained had a thickness, thickness distribution, releasability and water content equal to the results obtained in Example 1.

Example 3

A SPE film (composite film) and SPE composite electrode were obtained in the same manner as in Example 1, except that the base film was changed to PET-2 and an OPP cover film was not used. The SPE film of the SPE composite electrode thus obtained had a thickness of 30 μm±10% and excellent uniformity. The releasability of the PET film was very good and the film could be easily peeled off. The water content of the SPE film was 500 ppm or less.

Example 4

A SPE film (composite film) and SPE composite electrode were obtained in the same manner as in Example 1, except that the base film was changed to PET-3 and PE was used as the cover film. The SPE film of the SPE composite electrode had a thickness of 30 μm±20% and was uniform. The releasability of the PET film and the water content of the SPE film were the same as in Example 1.

Example 5

An SPE film (composite film) and SPE composite electrode were obtained in the same manner as in Example 1, except that the base film was changed to PET-4. The SPE film of the SPE composite electrode had a thickness, thickness distribution, releasability and water content equal to the results obtained in Example 4.

Example 6

Immediately after the PET film of the SPE composite electrode obtained in Example 1 was peeled off under an argon atmosphere (20° C.) having a dew point of −50° C., the resulting SPE composite electrode consisting of SPE/lithium cobaltate/aluminum foil was dipped in a 1 M LiBF4 electrolytic solution (in diethylcarbonate/ethylene carbonate (1:1 in weight ratio)) for one hour. Then, the SPE surface of the SPE composite electrode was laminated on the lithium surface of a lithium foil having a copper foil previously laminated thereon. Pressure was applied to the resulting laminate with a force applied on the upper surface thereof and a force in opposition thereto applied on the lower surface thereof, to produce a secondary battery element consisting of a SPE composite electrode (cupper/lithium/SPE/lithium cobaltate/aluminum). The edge portions of the element were sealed with an epoxy resin to obtain a secondary battery. The battery was subjected to repeated charging/discharging at a working voltage of from 2.0 to 4.2 V and a current density of 0.3 mA/cm$^2$ for 150 cycles, and it was found that the battery maintained 50% or more of its initial capacity.

COMPARATIVE EXAMPLE 1

An electrode was dipped in a fluid SPE under an atmosphere having a dew point of −50° C., excess fluid was removed by nip rolls, the solution was coated as thin as possible by a coater in a doctor knife system, ultraviolet rays were irradiated thereon under a nitrogen atmosphere to polymerize (cross-link) the SPE, and a laminate was roll-winded under an atmosphere at a temperature of 20° C. and a humidity of 5 RH %. Although the coating was made as thin as possible, the thickness and distribution thereof were at least 200 μm±20%. The water content of the SPE film of the laminate immediately after winding was 1,000 ppm.

According to the lamination method of the present invention, a SPE can easily be formed into a composite film, and handling after film formation is relatively easy. Hence, the inventive method is useful as an industrial method for making batteries.

According to the present invention, a SPE film having a large area can be continuously produced as a composite film in a simple and easy manner.

By means of the composite film of the present invention, a SPE film of homogeneous ion conductivity and uniform thickness can be handled in a stable condition, and can be stably preserved.

Furthermore, by using a composite film of the present invention, a SPE composite electrode can be obtained in which a SPE layer of homogeneous ion conductivity and uniform thickness is laminated on an electrode and in good electrical contact therewith. That is, in accordance with the invention, the SPE layer is homogeneously adhered to an electrode.

Also in accordance with the present invention, a SPE composite electrode having a large area can be obtained in which a SPE layer of homogeneous ion conductivity and uniform thickness is laminated on an electrode in a homogeneously adhered state. Thus, by using many cut and homogeneous pieces of a desired size, the present invention is extremely advantageous in producing a large number of electrochemical apparatus of homogeneous quality.

By using a composite film of the present invention wherein both surfaces of a SPE film layer are laminated with a base film or with a thin layer comprising a metal or a metal oxide which is laminated on a base film, and a cover film or an electrode, the step of forming a SPE film layer on an electrode can be simple and easy. This is because very strict moisture control of the atmosphere may not be necessary.

While the invention has been described in detail and with reference to specific embodiments thereof, it will be apparent to one skilled in the art that various changes and modifications can be made therein without departing from the spirit and scope thereof.

What is claimed is:

1. A method for laminating a solid polymer electrolyte film which comprises laminating a layer of a fluid solid polymer electrolyte precursor material on a base film or on a thin layer comprising a metal or a metal oxide which is laminated on a base film, and applying pressure to the resulting laminate with a force applied on the upper surface of the laminate and a force in opposition thereto applied on the lower surface of the laminate.

2. A method for laminating a solid polymer electrolyte film which comprises laminating a layer of a fluid solid polymer electrolyte precursor material on a base film or on a thin layer comprising a metal or a metal oxide which is laminated on a base film, followed by laminating a cover film on a surface of said fluid solid polymer electrolyte precursor material layer, and applying pressure to the resulting laminate with a force applied on the upper surface of the laminate and a force in opposition thereto applied on the lower surface of the laminate.

3. A method for laminating a solid polymer electrolyte film which comprises laminating a layer of a fluid solid polymer electrolyte precursor material containing a polymerizable compound on a base film or on a thin layer comprising a metal or a metal oxide which is laminated on a base film, polymerizing said polymerizable compound, thereby making said solid polymer electrolyte layer substantially non-flowable, and applying pressure to the resulting laminate with a force applied on the upper surface of the laminate and a force in opposition thereto applied on the lower surface of the laminate.

4. A method for laminating a solid polymer electrolyte film which comprises laminating a layer of a fluid solid polymer electrolyte precursor material containing a polymerizable compound on a base film or on a thin layer comprising a metal or a metal oxide which is laminated on a base film, followed by laminating a cover film on a surface of said fluid solid polymer electrolyte precursor material layer, polymerizing said polymerizable compound, thereby making said solid polymer electrolyte layer substantially non-flowable, and applying pressure to the resulting laminate with a force applied on the upper surface of the laminate and a force in opposition thereto applied on the lower surface of the laminate.

5. The method for laminating a solid polymer electrolyte film according to any one of claims 1 to 4, wherein the ion conductivity of the solid polymer electrolyte film is $10^{-4}$ $\Omega^{-1}$ cm$^{-1}$ or greater.

6. A method for producing a solid polymer electrolyte composite electrode which comprises providing a solid polymer electrolyte film in the form of a laminate prepared by:

laminating a layer of a fluid solid polymer electrolyte precursor material on a base film or on a thin layer comprising a metal or a metal oxide which is laminated on a base film, or laminating a layer of a fluid solid polymer electrolyte precursor material containing a polymerizable compound on a base film or on a thin layer comprising a metal or a metal oxide which is laminated on a base film, polymerizing said polymerizable compound, thereby making said solid polymer electrolyte layer substantially non-flowable, and applying pressure to the resulting laminate with a force applied on the upper surface of the laminate and a force in opposition thereto applied on the lower surface of the laminate;

laminating the solid polymer electrolyte surface of said laminate on an electrode previously coated with a curable adhesive such that the solid polymer electrolyte surface contacts the electrode;

and then curing the adhesive.

7. A method for producing a solid polymer electrolyte composite electrode which comprises providing a solid polymer electrolyte film in the form of a laminate prepared by:

laminating a layer of a fluid solid polymer electrolyte precursor material on a base film or on a thin layer comprising a metal or a metal oxide which is laminated on a base film, followed by laminating a cover film on a surface of said fluid solid polymer electrolyte layer and applying pressure to the resulting laminate with a force applied on the upper surface of the laminate and a force in opposition thereto applied on the lower surface of the laminate, or laminating a layer of a fluid solid polymer electrolyte precursor material containing a polymerizable compound on a base film or on a thin layer comprising a metal or a metal oxide which is laminated on a base film, followed by laminating a cover film on a surface of said fluid solid polymer electrolyte layer, polymerizing said polymerizable compound, thereby making said solid polymer electrolyte layer substantially non-flowable, and applying pressure to the resulting laminate with a force applied on the upper surface of the laminate and a force in opposition thereto applied on the lower surface of the laminate;

removing the cover film from the solid polymer electrolyte layer of said laminate;

laminating the solid polymer electrolyte surface of said laminate on an electrode previously coated with a curable adhesive such that the solid polymer electrolyte surface contacts the electrode;

and then curing the adhesive.

8. A method for producing a solid polymer electrolyte composite electrode which comprises providing a solid polymer electrolyte film in the form of a laminate prepared by:

laminating a layer of a fluid solid polymer electrolyte precursor material on a base film or on a thin layer comprising a metal or a metal oxide which is laminated on a base film, or laminating a layer of a fluid solid polymer electrolyte precursor material containing a polymerizable compound on a base film or on a thin layer comprising a metal oxide which is laminated on a base film, polymerizing said polymerizable compound, thereby making said solid polymer electrolyte layer substantially non-flowable, and applying pressure to the resulting laminate with a force applied on the upper surface of the laminate and a force in opposition thereto applied on the lower surface of the laminate;

laminating the solid polymer electrolyte surface of said laminate on an electrode previously coated with a curable adhesive such that the solid polymer electrolyte surface contacts the electrode;

curing the adhesive;

removing the base film or the base film having said thin layer thereon to expose a surface of said solid polymer electrolyte layer; and laminating another structural member on the exposed surface of said solid polymer electrolyte.

9. A method for producing a solid polymer electrolyte composite electrode which comprises providing a solid polymer electrolyte film in the form of a laminate prepared by:

laminating a layer of a fluid solid polymer electrolyte precursor material on a base film or on a thin layer comprising a metal or a metal oxide which is laminated on a base film, followed by laminating a cover film on a surface of said fluid solid polymer electrolyte layer and applying pressure to the resulting laminate with a force applied on the upper surface of the laminate and a force in opposition thereto applied on the lower surface of the laminate, or laminating a layer of a fluid solid polymer electrolyte precursor material containing a polymerizable compound on a base film or on a thin layer comprising a metal or a metal oxide which is laminated on a base film, followed by laminating a cover film on a surface of said fluid solid polymer electrolyte layer, polymerizing said polymerizable compound, thereby making said solid polymer electrolyte layer substantially non-flowable, and applying pressure to the resulting laminate with a force applied on the upper surface of the laminate and a force in opposition thereto applied on the lower surface of the laminate;

removing the cover film from the solid polymer electrolyte layer of said laminate;

laminating the solid polymer electrolyte surface of said laminate on an electrode previously coated with a curable adhesive such that the solid polymer electrolyte surface contacts the electrode;

curing the adhesive;

removing the base film or the base film having said thin layer thereon to expose a surface of said polymer electrolyte layer; and laminating another structural member on the exposed surface of said solid polymer electrolyte.

10. A method for producing a solid polymer electrolyte composite electrode which comprises providing a solid polymer electrolyte film in the form of a laminate prepared by:

laminating a layer of a fluid solid polymer electrolyte precursor material on a base film or on a thin layer comprising a metal or a metal oxide which is laminated on a base film, or laminating a layer of a fluid solid polymer electrolyte precursor material containing a polymerizable compound on a base film or on a thin layer comprising a metal or a metal oxide which is laminated on a base film, polymerizing said polymerizable compound, thereby making said solid polymer electrolyte layer substantially non-flowable, and applying pressure to the resulting laminate with a force applied on the upper surface of the laminate and a force in opposition thereto applied on the lower surface of the laminate;

laminating the solid polymer electrolyte surface of said laminate on an electrode previously coated with a curable adhesive such that the solid polymer electrolyte surface contacts the electrode;

curing the adhesive;

removing the base film or the base film having said thin layer thereon to expose a surface of said solid polymer electrolyte layer; and laminating a second electrode on the exposed surface of said solid polymer electrolyte.

11. A method for producing a solid polymer electrolyte composite electrode which comprises providing a solid polymer electrolyte film in the form of a laminate prepared by:

laminating a layer of a fluid solid polymer electrolyte precursor material on a base film or on a thin layer comprising a metal or a metal oxide which is laminated on a base film, followed by laminating a cover film on a surface of said fluid solid polymer electrolyte layer and applying pressure to the resulting laminate with a force applied on the upper surface of the laminate and a force in opposition thereto applied on the lower surface of the laminate, or laminating a layer of a fluid solid polymer electrolyte precursor material containing a polymerizable compound on a base film or on a thin layer comprising a metal or a metal oxide which is laminated on a base film, followed by laminating a cover film on a surface of said fluid solid polymer electrolyte layer, polymerizing said polymerizable compound, thereby making said solid polymer electrolyte layer substantially non-flowable, and applying pressure to the resulting laminate with a force applied on the upper surface of the laminate and a force in opposition thereto applied on the lower surface of the laminate;

removing the cover film from the solid polymer electrolyte layer of said laminate;

laminating the solid polymer electrolyte surface of said laminate on an electrode previously coated with a curable adhesive such that the solid polymer electrolyte surface contacts the electrode;

curing the adhesive;

removing the base film or the base film having said thin layer thereon to expose a surface of said polymer electrolyte layer; and laminating a second electrode on the exposed surface of said solid polymer electrolyte.

* * * * *